US012800757B2

(12) United States Patent
Hayashi

(10) Patent No.: US 12,800,757 B2
(45) Date of Patent: Nov. 17, 2026

(54) OBJECT DETECTION SYSTEM AND INFRASTRUCTURE SENSOR

(71) Applicant: Sumitomo Electric Industries, Ltd., Osaka (JP)

(72) Inventor: Yoshiaki Hayashi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 352 days.

(21) Appl. No.: 18/576,372

(22) PCT Filed: Apr. 28, 2022

(86) PCT No.: PCT/JP2022/019373

§ 371 (c)(1),
(2) Date: Jan. 4, 2024

(87) PCT Pub. No.: WO2023/281907

PCT Pub. Date: Jan. 12, 2023

(65) Prior Publication Data

US 2024/0329237 A1 Oct. 3, 2024

(30) Foreign Application Priority Data

Jul. 7, 2021 (JP) ................................ 2021-112775

(51) Int. Cl.
*G01S 13/91* (2006.01)
*G01S 13/86* (2006.01)

(52) U.S. Cl.
CPC .............. *G01S 13/91* (2013.01); *G01S 13/86* (2013.01)

(58) Field of Classification Search
CPC ................................ G01S 13/91; G01S 13/86
See application file for complete search history.

(56) References Cited

U.S. PATENT DOCUMENTS

2003/0055561 A1* 3/2003 Mori ....................... G01S 19/49 342/357.31
2012/0154200 A1 6/2012 Kajiki
2016/0343248 A1 11/2016 Mende
2016/0377702 A1 12/2016 Yomo et al.
2021/0190968 A1* 6/2021 Swan .................... G01S 13/931

FOREIGN PATENT DOCUMENTS

DE 10-2011-100628 A1 11/2012
EP 0087521 A2 9/1983
JP 2000-048296 A 2/2000

(Continued)

*Primary Examiner* — Timothy A Brainard
*Assistant Examiner* — Helena H Seraydaryan
(74) *Attorney, Agent, or Firm* — XSENSUS LLP

(57) ABSTRACT

This object detection system includes: an infrastructure sensor mounted to an arm extending from a stationary object fixed to a road surface or equipment, the arm being rotatable in a circumferential direction of the stationary object; and an angle sensor disposed at a place where the arm is connected to the stationary object, the angle sensor being configured to detect a rotation angle of the arm. The infrastructure sensor includes: a detection unit configured to detect a position of an object present in a detection target area of the infrastructure sensor; and a correction unit configured to correct the position of the object detected by the detection unit, based on the rotation angle detected by the angle sensor.

12 Claims, 14 Drawing Sheets

(56) References Cited

FOREIGN PATENT DOCUMENTS

| | | | |
|---|---|---|---|
| JP | 2008-179269 | A | 8/2008 |
| JP | 2012-127906 | A | 7/2012 |
| JP | 2017-009574 | A | 1/2017 |
| JP | 2017-508951 | A | 3/2017 |
| JP | 2017-194385 | A | 10/2017 |

* cited by examiner

OBJECT DETECTION SYSTEM AND INFRASTRUCTURE SENSOR

CROSS-REFERENCE TO RELATED APPLICATIONS

The present application is based on PCT/JP2022/019373, filed on Apr. 28, 2022, which claims priority from Japanese Patent Application No. 2021-112775, filed on Jul. 7, 2021, the entire contents of each are incorporated herein by reference.

TECHNICAL FIELD

The present disclosure relates to an object detection system and an infrastructure sensor.

BACKGROUND ART

PATENT LITERATURE 1 discloses the following road condition grasping device. That is, the intensity and the spectrum of reflected signals from vehicles are detected by a plurality of radio wave radars installed on lanes, and by use of the intensity and the spectrum of reflected signals from vehicles detected by the radio wave radars, the position and the speed of a corresponding vehicle in the lane direction are obtained. When at least two radio wave radars out of the radio wave radars installed in respective lanes have detected reflected signals from the same traveling vehicle, it is determined that the reflected signals are from the same vehicle. Then, with respect to the amplitude of the reflected signal from the same traveling vehicle, the maximum value is obtained every certain period of time previously determined for each radio wave radar. Then, through comparison of the maximum values, the lane and the position in the road width direction where the vehicle is present are estimated.

CITATION LIST

Patent Literature

PATENT LITERATURE 1: Japanese Laid-Open Patent Publication No. 2000-48296

SUMMARY OF THE INVENTION

An object detection system according to an aspect of the present disclosure includes: an infrastructure sensor mounted to an arm extending from a stationary object fixed to a road surface or equipment, the arm being rotatable in a circumferential direction of the stationary object; and an angle sensor disposed at a place where the arm is connected to the stationary object, the angle sensor being configured to detect a rotation angle of the arm. The infrastructure sensor includes: a detection unit configured to detect a position of an object present in a detection target area of the infrastructure sensor; and a correction unit configured to correct the position of the object detected by the detection unit, based on the rotation angle detected by the angle sensor.

An object detection system according to another aspect of the present disclosure includes: an infrastructure sensor mounted to an arm extending from a stationary object fixed to a road surface or equipment, the arm being rotatable in a circumferential direction of the stationary object; and a gyro sensor configured to detect an angular velocity of the arm. The infrastructure sensor includes: a detection unit configured to detect a position of an object present in a detection target area of the infrastructure sensor; and a correction unit configured to correct the position of the object detected by the detection unit, based on a rotation angle of the arm relative to the stationary object, the rotation angle being obtained based on the angular velocity detected by the gyro sensor.

An infrastructure sensor according to an aspect of the present disclosure is mounted to an arm extending from a stationary object fixed to a road surface or equipment, the arm being rotatable in a circumferential direction of the stationary object. The infrastructure sensor includes: a detection unit configured to detect a position of an object present in a detection target area of the infrastructure sensor; and a correction unit configured to correct the position of the object detected by the detection unit, based on a rotation angle of the arm relative to the stationary object, the rotation angle having been detected by an angle sensor disposed at a place where the arm is connected to the stationary object.

An infrastructure sensor according to another aspect of the present disclosure is mounted to an arm extending from a stationary object fixed to a road surface or equipment, the arm being rotatable in a circumferential direction of the stationary object. The infrastructure sensor includes: a detection unit configured to detect a position of an object present in a detection target area of the infrastructure sensor; and a correction unit configured to correct the position of the object detected by the detection unit, based on a rotation angle of the arm relative to the stationary object, the rotation angle being obtained based on an angular velocity of the arm detected by a gyro sensor disposed at the arm.

The present disclosure can be realized not only as an object detection system and an infrastructure sensor that have characteristic configurations as described above, but also as a method that has steps of characteristic processes of the object detection system, or as a computer program that causes a computer to execute the above-described method. The present disclosure also allows a part of the infrastructure sensor to be realized by a semiconductor integrated circuit.

DETAILED DESCRIPTION

Figure 1:
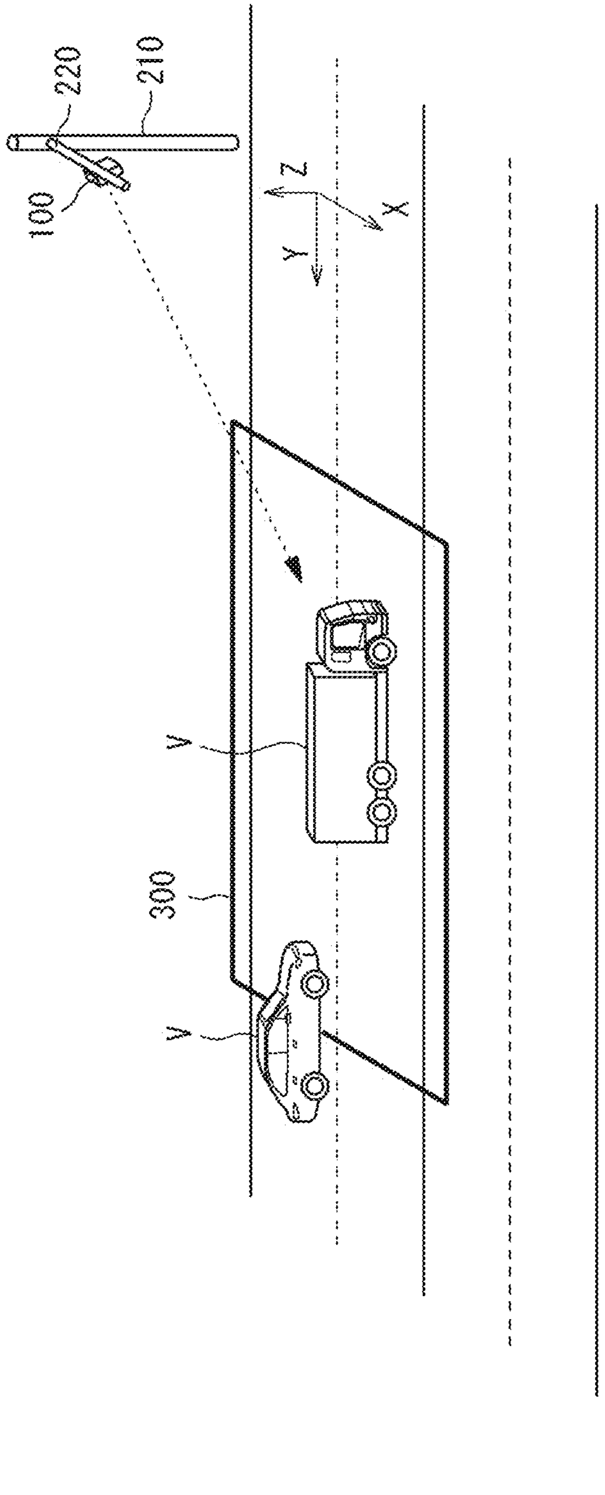
FIG. 1 shows a use example of an infrastructure sensor according to an embodiment.

Problems to be Solved by the Present Disclosure

A sensor (also referred to as an "infrastructure sensor") used in traffic monitoring is mounted to an arm extending over a road from a pole or a telephone pole (also referred to as a "post") fixed to a side of a road, for example. When the arm has rotated relative to the post due to strong wind, vibration, or the like, the installation position of the infrastructure sensor is shifted, whereby vehicles cannot be accurately detected anymore.

Effects of the Present Disclosure

According to the present disclosure, an object such as a vehicle can be accurately detected even when the installation position of the infrastructure sensor has been shifted.

Outline of Embodiment of the Present Disclosure

Hereinafter, the outline of an embodiment of the present disclosure will be listed and described.

(1) An object detection system according to the present embodiment includes: an infrastructure sensor mounted to an arm extending from a stationary object fixed to a road surface or equipment, the arm being rotatable in a circumferential direction of the stationary object; and an angle sensor disposed at a place where the arm is connected to the stationary object, the angle sensor being configured to detect a rotation angle of the arm. The infrastructure sensor includes: a detection unit configured to detect a position of an object present in a detection target area of the infrastructure sensor; and a correction unit configured to correct the position of the object detected by the detection unit, based on the rotation angle detected by the angle sensor. Accordingly, when the installation position of the infrastructure sensor has been shifted, the detection result obtained by the infrastructure sensor can be corrected. Therefore, an object such as a vehicle can be accurately detected by the infrastructure sensor.

(2) The angle sensor may include: a first member fixed to the stationary object; and a second member fixed to the arm and configured to rotate in a circumferential direction of the first member in accordance with rotation of the arm, and may detect a rotation angle of the second member relative to the first member, thereby detecting the rotation angle of the arm relative to the stationary object. Accordingly, the angle sensor that detects the rotation angle of the arm relative to the stationary object can be realized.

(3) The arm may be supported by a support member so as to be rotatable relative to the stationary object. The support member may rotate in the circumferential direction of the stationary object in accordance with rotation of the arm. The angle sensor may include: a first member fixed to the stationary object; and a second member fixed to the support member and configured to rotate in a circumferential direction of the first member in accordance with rotation of the support member, and may detect a rotation angle of the second member relative to the first member, thereby detecting the rotation angle of the arm relative to the stationary object. Accordingly, the angle sensor can be mounted to the connection place between the stationary object and the arm so as to be able to detect the rotation angle of the arm relative to the stationary object.

(4) When the rotation angle detected by the angle sensor exceeds a first threshold, the correction unit may output abnormality information without correcting the position of the object. Accordingly, when the shift amount of the position of the infrastructure sensor is too large to be allowed, abnormality information can be outputted without correcting the detection result obtained by the infrastructure sensor.

(5) The object detection system may further include an inclination sensor configured to detect an inclination angle of the stationary object relative to a reference direction. When the inclination angle detected by the inclination sensor exceeds a second threshold, the correction unit may output abnormality information without correcting the position of the object. Accordingly, when the inclination of the stationary object is too large to be allowed, abnormality information can be outputted without correcting the detection result obtained by the infrastructure sensor.

(6) An infrastructure sensor according to the present embodiment is mounted to an arm extending from a stationary object fixed to a road surface or equipment, the arm being rotatable in a circumferential direction of the stationary object. The infrastructure sensor includes: a detection unit configured to detect a position of an object present in a detection target area of the infrastructure sensor; and a correction unit configured to correct the position of the object detected by the detection unit, based on a rotation angle of the arm relative to the stationary object, the rotation angle having been detected by an angle sensor disposed at a place where the arm is connected to the stationary object. Accordingly, when the installation position of the infrastructure sensor has been shifted, the detection result obtained by the infrastructure sensor can be corrected. Therefore, an object such as a vehicle can be accurately detected by the infrastructure sensor.

(7) An object detection system according to the present embodiment includes: an infrastructure sensor mounted to an arm extending from a stationary object fixed to a road surface or equipment, the arm being rotatable in a circumferential direction of the stationary object; and a gyro sensor configured to detect an angular velocity of the arm. The infrastructure sensor includes: a detection unit configured to detect a position of an object present in a detection target area of the infrastructure sensor; and a correction unit configured to correct the position of the object detected by the detection unit, based on a rotation angle of the arm relative to the stationary object, the rotation angle being obtained based on the angular velocity detected by the gyro sensor. Accordingly, when the installation position of the infrastructure sensor has been shifted, the detection result obtained by the infrastructure sensor can be corrected. Therefore, an object such as a vehicle can be accurately detected by the infrastructure sensor.

(8) An infrastructure sensor according to the present embodiment is mounted to an arm extending from a stationary object fixed to a road surface or equipment, the arm being rotatable in a circumferential direction of the stationary object. The infrastructure sensor includes: a detection unit configured to detect a position of an object present in a detection target area of the infrastructure sensor; and a correction unit configured to correct the position of the object detected by the detection unit, based on a rotation angle of the arm relative to the stationary object, the rotation angle being obtained based on an angular velocity of the arm detected by a gyro sensor disposed at the arm. Accordingly, when the installation position of the infrastructure sensor has been shifted, the detection result obtained by the infrastructure sensor can be corrected. Therefore, an object such as a vehicle can be accurately detected by the infrastructure sensor.

Details of Embodiment of the Present Disclosure

Hereinafter, an embodiment of the present disclosure will be described with reference to the drawings. At least some parts of the embodiment described below may be combined as desired.

[1. Traffic Monitoring System]

FIG. 1 shows a use example of an infrastructure sensor according to an embodiment. An infrastructure sensor 100 according to the present the embodiment is a radio wave radar for traffic monitoring. The infrastructure sensor 100 is mounted to an arm 220 connected to a pole 210 being a stationary object provided to a road or a vicinity of the road. The infrastructure sensor 100 applies a radio wave (millimeter wave) to a target area 300 (detection target area) on the road and receives a reflected wave thereof, thereby detecting an object (e.g., a vehicle V) in the target area 300. More specifically, the infrastructure sensor 100 can detect the distance from the infrastructure sensor 100 to the vehicle V traveling on the road, the speed of the vehicle V, and the horizontal angle of the position where the vehicle V is present relative to the radio wave application axis of the infrastructure sensor 100.

The infrastructure sensor 100 is installed such that the direction (the direction indicated by a broken line in FIG. 1; hereinafter, referred to as a "radio wave application direction") of the radio wave application axis is oriented toward the target area 300. If the radio wave application direction is not accurately oriented toward the target area 300, the infrastructure sensor 100 cannot accurately detect an object in the target area 300. Therefore, the angle of the infrastructure sensor 100 is adjusted such that the radio wave application direction is oriented toward the target area 300.

In the following description, in the target area 300, the lane longitudinal direction is defined as Y, the lane width direction is defined as X, and the height direction is defined as Z. The origin is a point on the road surface vertically below the infrastructure sensor 100. The coordinate system defined by X, Y. and Z is used by the infrastructure sensor 100. That is, the infrastructure sensor 10 identifies the coordinate of the detected vehicle V in an XYZ coordinate space.

Figure 2:
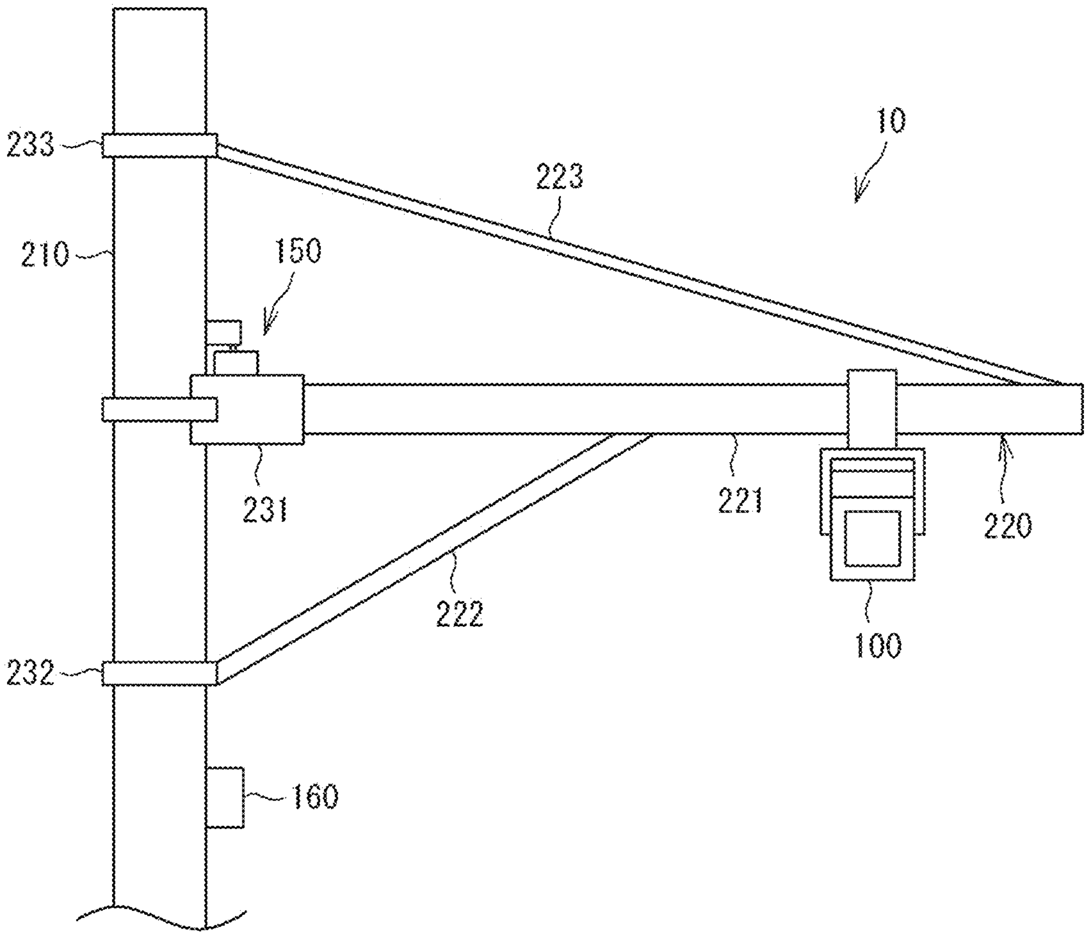
FIG. 2 shows an example of a configuration of a traffic monitoring system according to the embodiment.

FIG. 2 shows an example of a configuration of a traffic monitoring system (object detection system) 10 according to the embodiment. The traffic monitoring system 10 includes the infrastructure sensor 100, an angle sensor 150, and an inclination sensor 160.

The pole 210 extends in the vertical direction and is fixed to the ground. The arm 220 is connected to the pole 210 so as to be rotatable about the axis (vertical axis) of the pole 210. Specifically, the arm 220 is connected to the pole 210 via support members 231, 232, 233. The arm 220 includes an arm body 221, a lower support arm 222, and an upper support arm 223. The arm body 221 is a member having a rod shape linearly extending in the horizontal direction. The arm body 221 is connected to the pole 210 via the support member 231. The support member 232 is disposed below the support member 231 in the pole 210. The lower support arm 222 is a member having an inclined rod shape that couples the lower side part of the arm body 221 and the pole 210 to each other. The lower support arm 222 is connected to the pole 210 via the support member 232, at a position below the connection position of the arm body 221 in the pole 210. The support member 233 is disposed above the support member 231 in the pole 210. The upper support arm 223 is a member having an inclined rod shape that couples the upper side part of the arm body 221 and the pole 210 to each other. The upper support arm 223 is connected to the pole 210 via the support member 233 at a position above the connection position of the arm body 221 in the pole 210.

The support members 231, 232, 233 support the arm 220 so as to be rotatable relative to the pole 210. That is, the support member 231 supports the arm body 221 so as to be rotatable in the circumferential direction about the axis of the pole 210. The support member 232 supports the lower support arm 222 so as to be rotatable in the circumferential direction about the axis of the pole 210. The support member 233 supports the upper support arm 223 so as to be rotatable in the circumferential direction about the axis of the pole 210. Accordingly, for example, when a force in the rotation direction about the axis of the pole 210 has acted on the arm 220 due to wind, vibration, or the like, the arm 220 rotates in the circumferential direction of the above-described axis, whereby breakage of the arm 220 is suppressed.

The angle sensor 150 is disposed at a connection place where the arm 220 is connected to the pole 210. For example, the angle sensor 150 is disposed at a connection place where the arm body 221 is connected to the pole 210. The "connection place" can include not only a portion (hereinafter, referred to as a "junction portion") where the pole 210 and the arm 220 are in contact with each other, but also a peripheral portion of the junction portion. For example, when the angle sensor 150 is in contact with the peripheral portion of the junction portion in the pole 210 and is in contact with the peripheral portion of the junction portion in the arm 220, the angle sensor 150 is disposed at the "connection place".

The connection place between the pole 210 and the arm 220 includes not only the connection place between the pole 210 and the arm body 221, but also the connection place between the pole 210 and the lower support arm 222 and the connection place between the pole 210 and the upper support arm 223. The angle sensor 150 may be disposed, not at the connection place between the pole 210 and the arm body 221, but at the connection place between the pole 210 and the lower support arm 222, or at the connection place between the pole 210 and the upper support arm 223.

The inclination sensor 160 is disposed at the pole 210. The inclination sensor 160 can detect the inclination angle of the axial line of the pole 210 relative to the vertical axis. The inclination sensor 160 outputs inclination data indicating the detected inclination angle. The vertical axis direction is an example of a "reference direction".

The angle sensor 150 and the inclination sensor 160 are connected to the infrastructure sensor 100 by signal lines (not shown). Output signals of the angle sensor 150 and the inclination sensor 160 are provided to the infrastructure sensor 100.

[2. Angle Sensor]

Figure 3A:
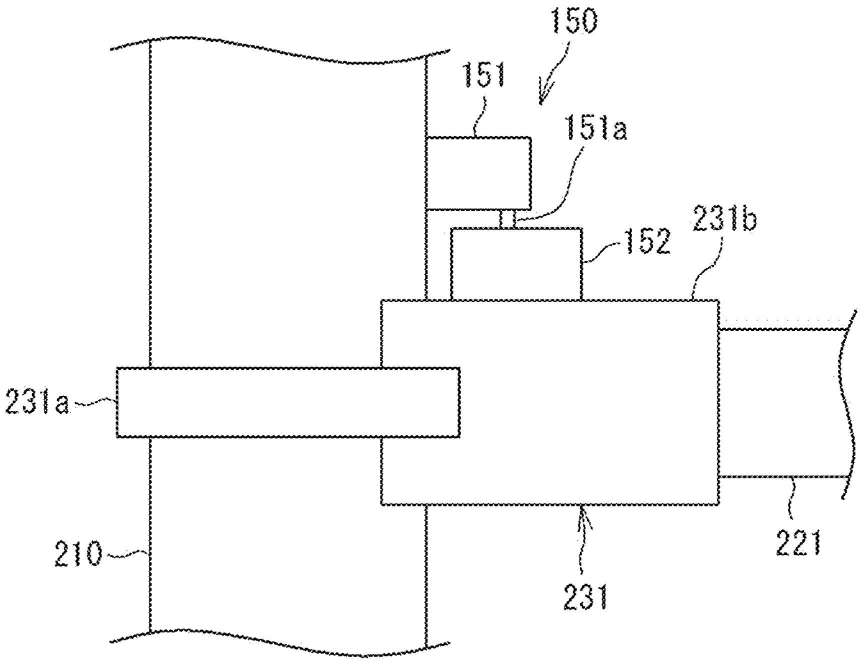
FIG. 3A is a side view showing an example of a configuration of an angle sensor according to the embodiment.
Figure 3B:
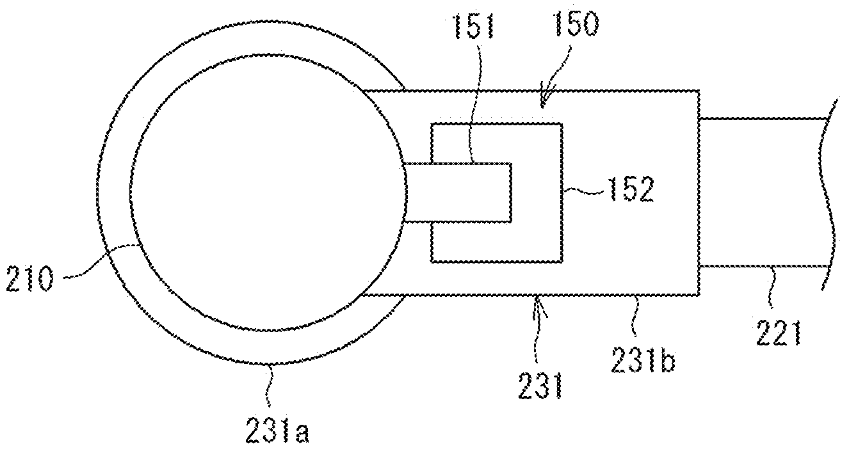
FIG. 3B is a plan view showing an example of a configuration of the angle sensor according to the embodiment.

FIG. 3A and FIG. 3B show an example of a configuration of an angle sensor according to the embodiment. FIG. 3A is a side view of the angle sensor 150 and FIG. 3B is a plan view of the angle sensor 150. As shown in FIG. 3A and FIG. 3B, the angle sensor 150 according to the embodiment includes a first member 151 and a second member 152. The first member 151 is mounted to the pole 210 and the second member 152 is mounted to the arm body 221. More specifically, the second member 152 is mounted to the support member 231. The angle sensor 150 detects the rotation angle of the second member 152 relative to the first member 151, thereby detecting the rotation angle of the arm 220 relative to the pole 210. The rotation angle of the arm 220 relative to the pole 210 is the displacement angle of the arm 220 when the arm 220 has rotated in the circumferential direction about the axis of the pole 210. The rotation angle of the second member 152 relative to the first member 151 is the displacement angle of the second member 152 when the second member 152 has rotated relative to the axis of the pole 210 having the first member 151 fixed thereto.

The configuration of the angle sensor 150 according to the embodiment will be described further in detail. The support member 231 includes an annular part 231*a* and an arm fixation part 231*b*. The annular part 231*a* is formed in a circular ring shape and is wound around the outer periphery of the pole 210. The annular part 231*a* includes an inner ring part and an outer ring part, for example, and is configured such that the outer ring part is rotatable relative to the inner ring part. Accordingly, apart (outer ring part) of the annular part 231*a* is rotatable in the circumferential direction about the axis of the pole 210. The arm fixation part 231*b* is mounted to the outer ring part of the annular part 231*a* Therefore, the arm fixation part 231*b* is rotatable in the circumferential direction about the axis of the pole 210. The arm fixation part 231*b* is formed in a tubular shape, and is mounted to the arm body 221 so as to wrap an end portion of the arm body 221.

The second member 152 is mounted to the arm fixation part 231*b*. Therefore, when the arm 220 rotates relative to the pole 210, the second member 152 also rotates integrally with the arm 220. Meanwhile, the first member 151 is fixed to the pole 210. When the arm 220 has rotated relative to the pole 210, the first member 151 does not rotate. Therefore, the first member 151 and the second member 152 rotate relative to each other.

In the present the embodiment, the angle sensor 150 is a potentiometer. A small gap is provided between the first member 151 and the second member 152. The angle sensor 150 includes a brush 151*a* extending from the first member 151 to the second member 152.

Figure 4:
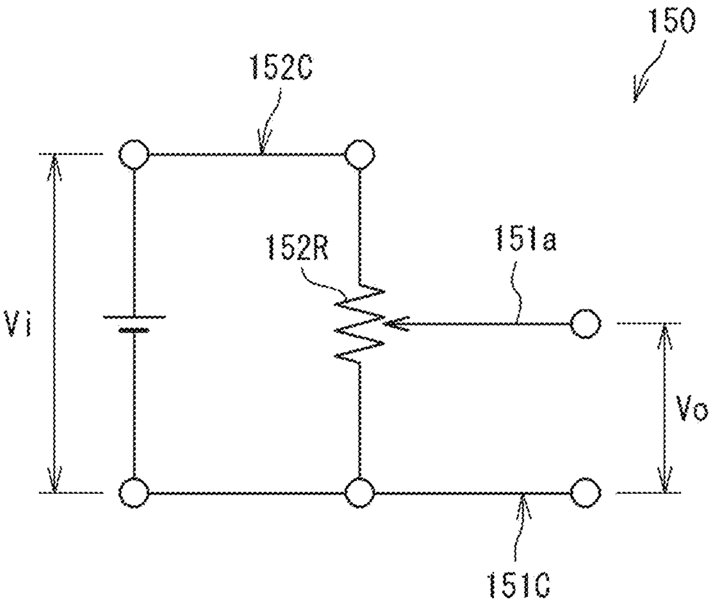
FIG. 4 shows an example of an electric circuit of the angle sensor according to the embodiment.

FIG. 4 shows an example of an electric circuit of the angle sensor 150 according to the embodiment. The angle sensor 150 includes a first circuit 151C and a second circuit 152C. The first circuit 151C is provided to the first member 151. The second circuit 152C is provided to the second member 152. The first circuit 151C includes the brush 151*a*, and the second circuit 152C includes a resistor 152R. The brush 151*a* is in contact with the resistor 152R, and when the arm 220 rotates relative to the pole 210, the brush 151*a* moves on the resistor 152R. An input voltage Vi is applied between both ends of the resistor 152R. A voltage Vo between the brush 151*a* and one end of the resistor 152R is outputted. The output voltage Vo changes in accordance with the position of the brush 151*a* in the resistor 152R. That is, the output voltage Vo indicates the rotation angle of the arm 220 relative to the pole 210. The angle sensor 150 outputs angle data indicating the detected rotation angle.

The first circuit 151C may be provided to the second member 152, and the second circuit 152C may be provided to the first member 151. With the angle sensor 150 having such a configuration as well, the rotation angle of the arm 220 relative to the pole 210 can be detected.

[3. Configuration of Infrastructure Sensor]

Figure 5:
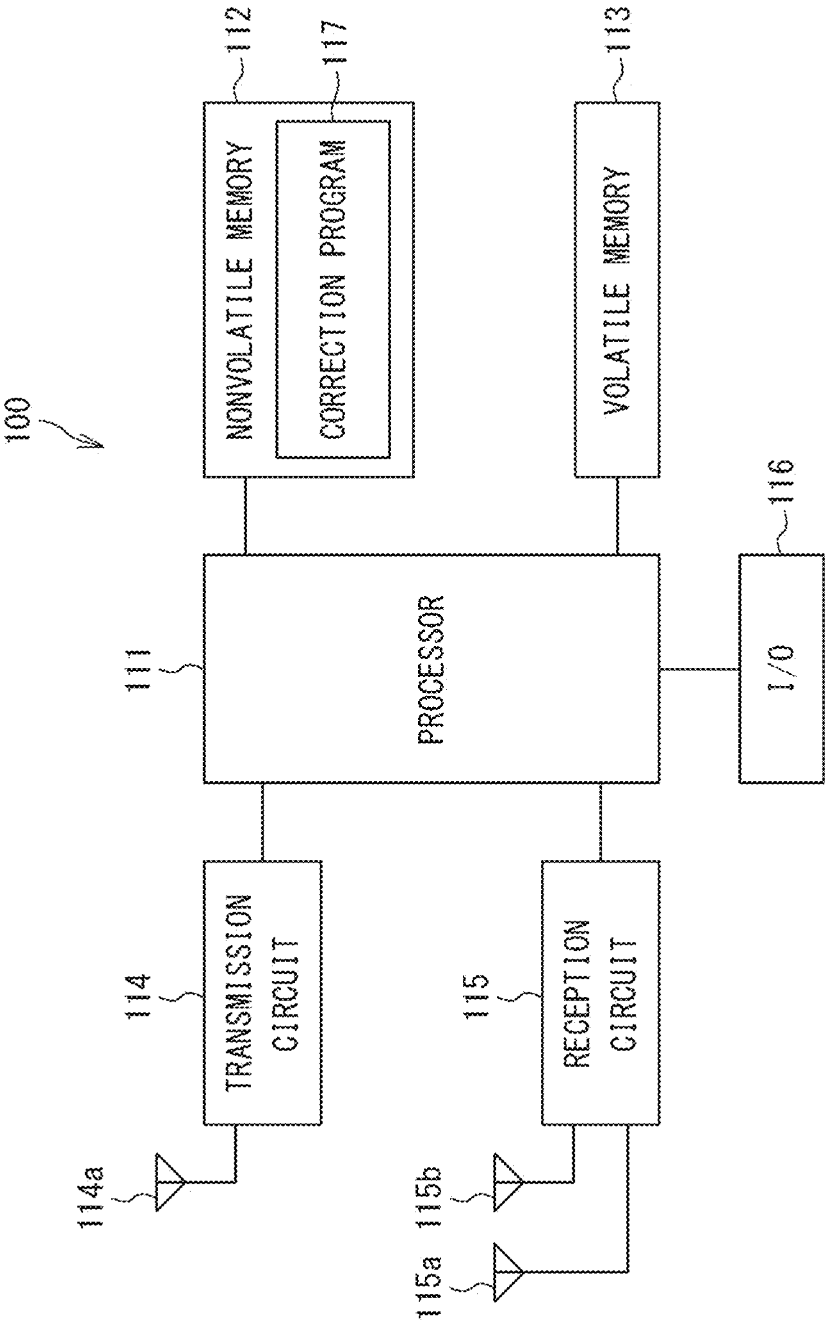
FIG. 5 is a block diagram showing an example of an internal configuration of the infrastructure sensor according to the embodiment.

FIG. 5 is a block diagram showing an example of an internal configuration of an infrastructure sensor according to the embodiment. The infrastructure sensor 100 includes a processor 111, a nonvolatile memory 112, a volatile memory 113, a transmission circuit 114, a reception circuit 115, and an input/output interface (I/O) 116.

The volatile memory 113 is a semiconductor memory such as an SRAM (Static Random Access Memory), or a DRAM (Dynamic Random Access Memory), for example. The nonvolatile memory 112 is a flash memory, a hard disk, a ROM (Read Only Memory), or the like, for example. A correction program 117, which is a computer program, and data to be used in execution of the correction program 117 are stored in the nonvolatile memory 112. The infrastructure sensor 100 is configured to include a computer, and each function of the infrastructure sensor 100 is exhibited by the correction program 117, which is the computer program stored in a storage device of the computer, being executed by the processor 111. The correction program 117 can be stored in a storage medium such as a flash memory, ROM, CD-ROM, or the like. The processor 111 executes the correction program 117 and corrects the detection position of the vehicle V in accordance with the rotation angle of the arm 220 as described later.

The processor 11 is a CPU (Central Processing Unit), for example. However, the processor 111 is not limited to a CPU. The processor 111 may be a GPU (Graphics Processing Unit). The processor 111 may be, for example, an ASIC (Application Specific Integrated Circuit) or may be a programmable logic device such as a gate array or an FPGA (Field Programmable Gate Array). In this case, the ASIC or the programmable logic device is configured to be able to execute a process similar to that of the correction program 117.

The transmission circuit 114 includes a transmission antenna 114*a*. The transmission circuit 114 generates a modulated wave and transmits the generated modulated wave from the transmission antenna 114*a*. The transmitted modulated wave hits an object (e.g., the vehicle V) and is reflected.

The reception circuit 115 includes reception antennas 115*a*, 115*b*. The reception antennas 115*a*, 115*b* receive the reflected wave from the vehicle V. The reception circuit 115 performs signal processing on the received reflected wave. Reflected wave data generated through the signal processing is provided to the processor 111. The processor 111 analyzes the reflected wave data and detects the position and the speed of the vehicle V.

The I/O 116 is connected to the angle sensor 150 and the inclination sensor 160 via signal lines. The I/O 116 receives angle data outputted from the angle sensor 150 and inclination data outputted from the inclination sensor 160. Further, the I/O 116 may be able to communicate with an external device through wired or wireless communication. For example, the I/O 116 can transmit information of the vehicle V detected by the infrastructure sensor 100 to an external device. For example, the I/O 116 may include a wireless communication interface for DSRC (Dedicated Short Range Communications). The I/O 116 may transmit position information and speed information of the vehicle V detected through roadside-to-vehicle communication, to the vehicle V traveling in the target area 300. Further, the I/O 116 may be able to be connected to an external terminal used by an installation worker who installs the infrastructure sensor 100. The I/O 116 may be able to output information, e.g., abnormality information, to be used in maintenance of the infrastructure sensor 100, to the external terminal.

[4. Function of Infrastructure Sensor]

Figure 6:
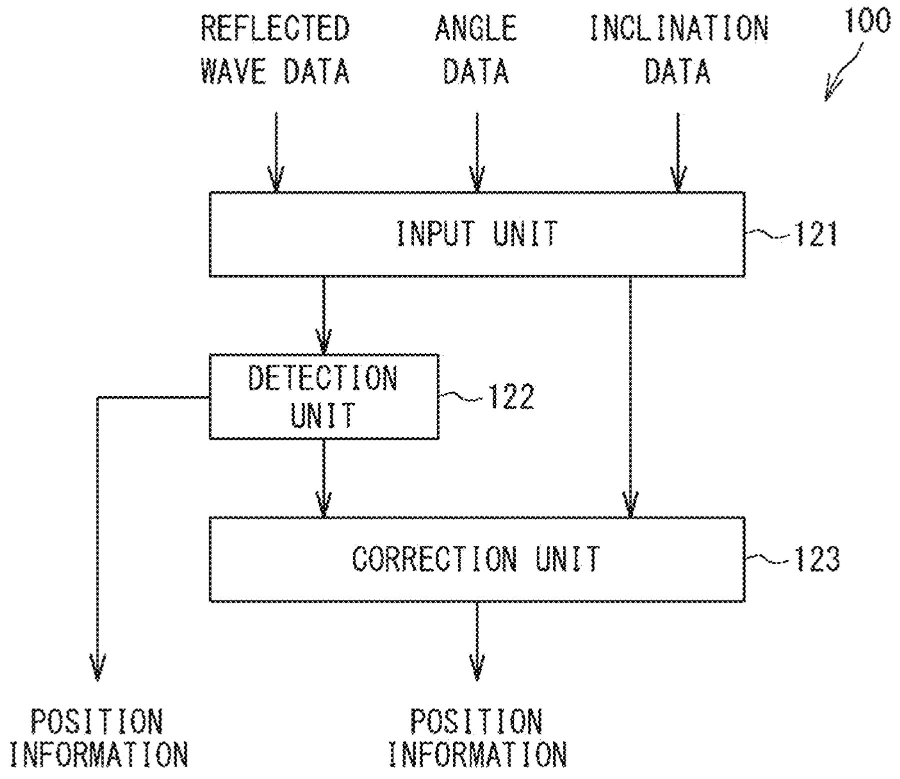
FIG. 6 is a function block diagram showing an example of the function of the infrastructure sensor according to the embodiment.

FIG. 6 is a function block diagram showing an example of the function of the infrastructure sensor 100 according to the embodiment. By the processor 111 executing the correction program 117, the infrastructure sensor 100 exhibits the functions of an input unit 121, a detection unit 122, and a correction unit 123.

The input unit 121 receives the reflected wave data generated by the reception circuit 115. The input unit 121 receives the angle data outputted from the angle sensor 150. Further, the input unit 121 receives the inclination data outputted from the inclination sensor 160.

Based on the reflected wave data received by the input unit 121, the detection unit 122 detects the position of the object present in the detection target area of the infrastructure sensor 100. Specifically, the detection unit 122 extracts a reflection point, which is a peak point included in the reflected wave. The reflected wave data includes data indicating the waveform of the reflected wave regarding the distance and data indicating the waveform of the reflected wave regarding the angle. The detection unit 122 extracts a peak point from each of the waveform of the reflected wave regarding the distance and the waveform of the reflected wave regarding the angle. The detection unit 122 associates the peak point in the reflected wave regarding the distance with the peak point in the reflected wave regarding the angle, thereby determining the reflection point.

There are cases where the radio wave applied from the infrastructure sensor 100 is reflected by a plurality of vehicles V at the same time. The detection unit 122 groups reflection points regarding the same vehicle V. Based on the reflected waves received by the reception antennas 115*a*, 115*b*, the detection unit 122 identifies the position of the vehicle V. The position of the vehicle is indicated as a coordinate value in the XYZ coordinate system. Specifically, the detection unit 122 determines a representative value of the reflection points belonging to the same group, and sets the determined representative value as the position of the vehicle. For example, the representative value is the center of gravity. However, the position of the vehicle may be a representative value other than the center of gravity of the plurality of reflection points. For example, the representative value may be the mean of the reflection points or may be the median of the reflection points. The detection unit 122 outputs position information indicating the detected position of the vehicle V.

Based on the rotation angle detected by the angle sensor 150, the correction unit 123 corrects the position of the vehicle V detected by the detection unit 122. When the arm 220 has not rotated relative to the pole 210, that is, when no rotation angle has been detected by the angle sensor 150, the correction unit 123 does not correct the position of the vehicle V detected by the detection unit 122. In this case, the position information of the vehicle V detected by the detection unit 122 is outputted.

In the following, the principle of correction of the position of the vehicle V by the correction unit 123 will be described.

Figure 7:
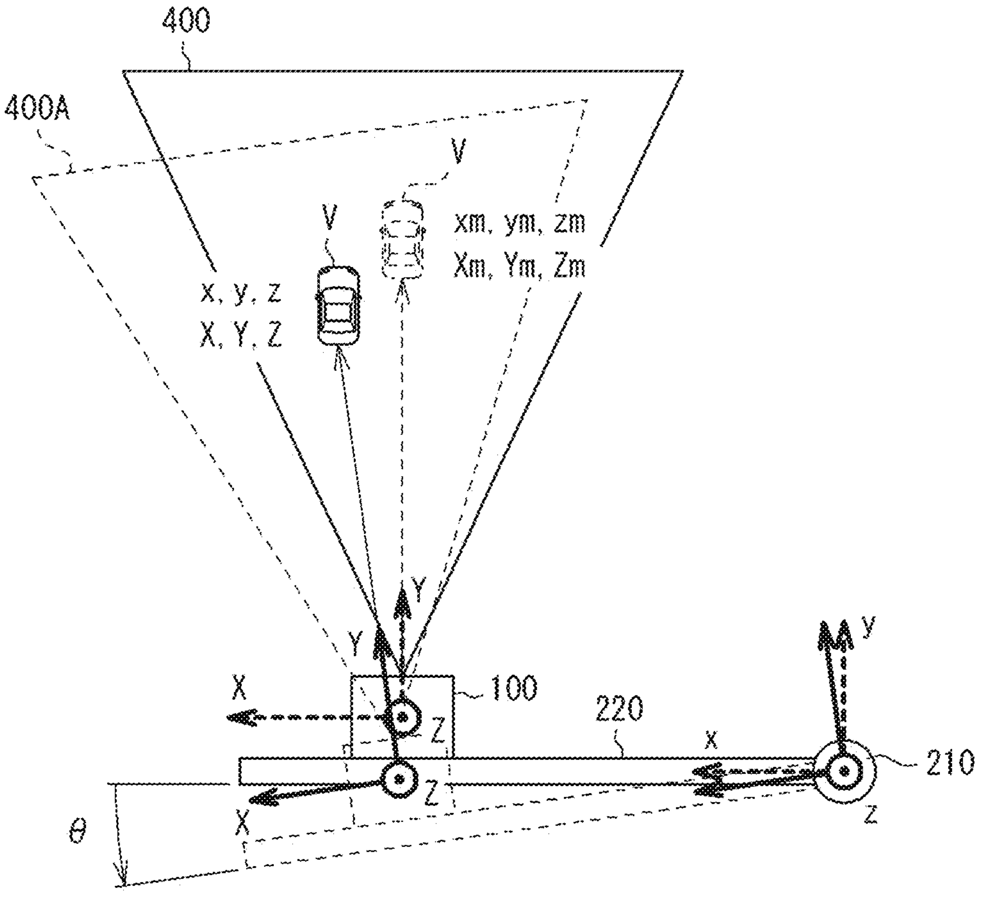
FIG. 7 is a diagram for describing the principle of correction of a detection result obtained by the infrastructure sensor according to the embodiment.

FIG. 7 is a diagram for describing the principle of correction of a detection result obtained by the infrastructure sensor according to the embodiment. As shown in FIG. 7, a case where the arm 220 has rotated by an angle θ in the counterclockwise direction in the drawing about the axis of the pole 210 is considered. A detection range 400 of the infrastructure sensor 100 before rotation changes to a detection range 400A due to rotation of the arm 220. The XYZ coordinate system of the infrastructure sensor 100 is shifted from the solid line to the broken line due to the positional change of the infrastructure sensor 100. After the rotation of the arm 220, when the infrastructure sensor 100 detects the position of the vehicle V, a coordinate (Xm, Ym, Zm) is obtained as a detection result. However, since the coordinate system set in the infrastructure sensor 100 has not been modified after the rotation of the arm 220, the coordinate (Xm, Ym, Zm) is shifted from the actual position (X, Y, Z) of the vehicle. That is, although the actual vehicle V is present at the position on the solid line, the detection result obtained by the infrastructure sensor 100 is the position on the broken line. The correction unit 123 corrects the detection position shifted like this.

In the correction by the correction unit 123 of the detection result obtained by the infrastructure sensor 100, an xyz coordinate system different from the XYZ coordinate system is used. The xyz coordinate system is an orthogonal coordinate system having an origin on the central axis of the pole 210. The z axis is the central axis of the pole 210 and the origin is the intersection point between the ground surface and the z axis. The x axis is parallel to the longitudinal direction of the arm 220, and the y axis is an axis orthogonal to the x axis and the z axis. The correction unit 123 converts the coordinate (Xm, Ym, Zm) of the detected position of the vehicle, to a coordinate (xm, ym, zm) in the xyz coordinate system. Here, the Z axis and the z axis are the same, and the height of the infrastructure sensor 100 does not change due to the rotation of the arm 220. Thus, Zm, zm, Z, and z are all the same value.

By using the following formula (1), the correction unit 123 corrects the coordinate value (xm, ym, zm) of the detection position, to calculate a corrected coordinate value (x, y, z).

[Math. 1]

$$\begin{pmatrix} x \\ y \\ z \end{pmatrix} = \begin{pmatrix} \cos(\theta) & -\sin(\theta) & 0 \\ \sin(\theta) & \cos(\theta) & 0 \\ 0 & 0 & 1 \end{pmatrix} \begin{pmatrix} x_m \\ y_m \\ z_m \end{pmatrix} \tag{1}$$

The coordinate value (x, y, z) is a coordinate value obtained by rotating the coordinate value (xm, ym, zm) by θ in the counterclockwise direction in the drawing, about the origin of the xyz coordinate system. That is, the coordinate value (x, y, z) indicates the actual position of the vehicle V.

The correction unit 123 inversely converts the calculated correction coordinate value (x, y, z) to a coordinate (X, Y, Z) in the XYZ coordinate system. Accordingly, correction of the detection result obtained by the infrastructure sensor 100 is completed.

FIG. 6 is referred to again. When the rotation angle detected by the angle sensor 150 is in a first range, the correction unit 123 corrects the position of the vehicle V When the rotation angle detected by the angle sensor 150 is outside the first range, the correction unit 123 outputs abnormality information without correcting the position of the vehicle V. The first range is defined by a first limit value (e.g., upper limit value) and a second limit value (e.g., lower limit value). The rotation angle detected by the angle sensor 150 being outside the first range is synonymous with the rotation angle exceeding either one of the first limit value and the second limit value. That is, in other words, when the rotation angle exceeds a threshold (the first limit value or the second limit value), the correction unit 123 outputs abnormality information without correcting the position of the vehicle V The first limit value and the second limit value of the first range is an example of a "first threshold".

Figure 8A:
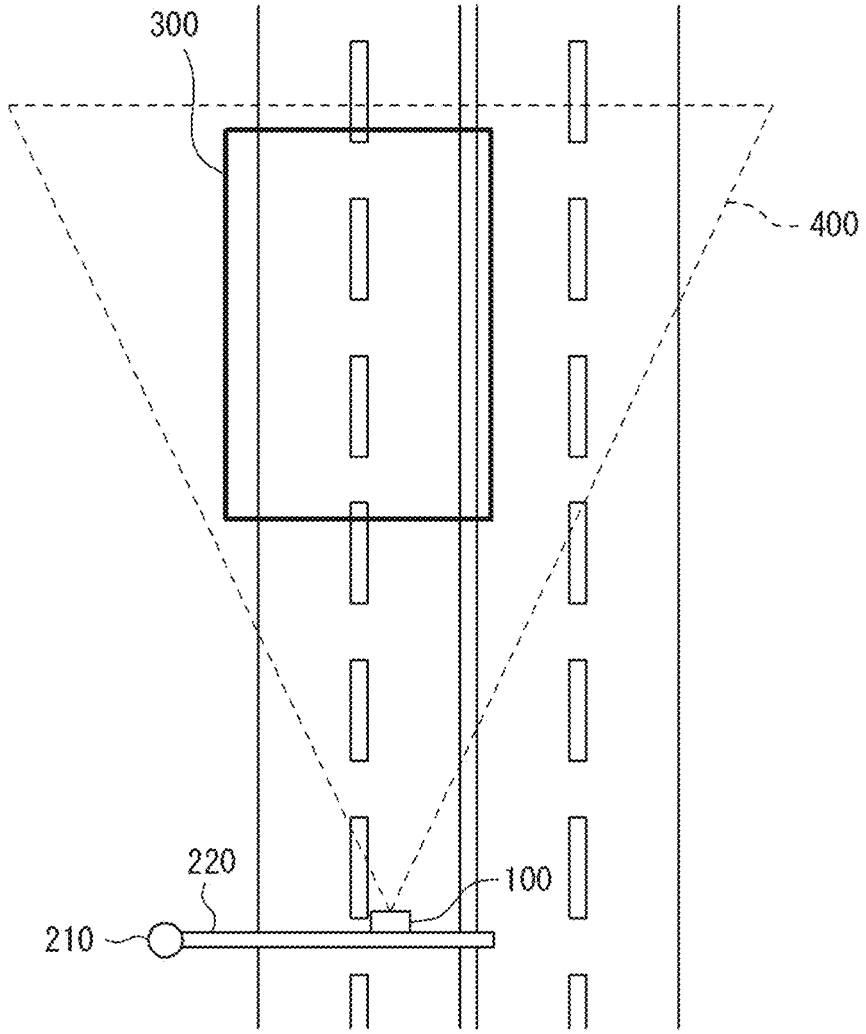
FIG. 8A shows an example of a detection range of the infrastructure sensor when an arm has not rotated relative to a pole.
Figure 8B:
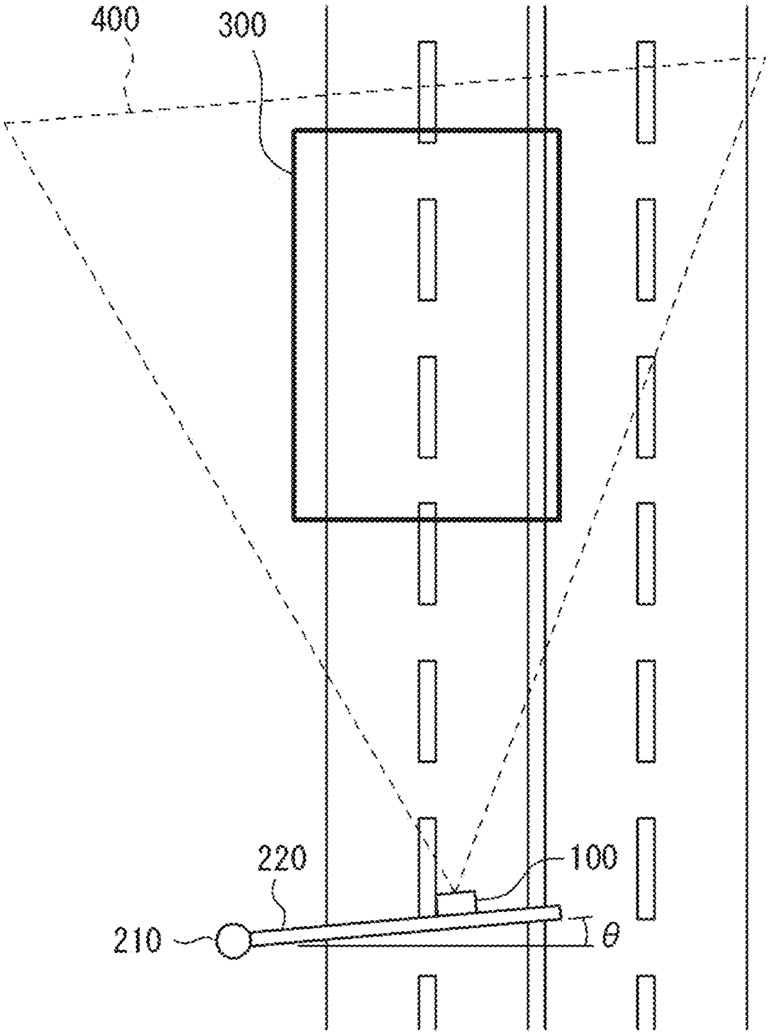
FIG. 8B shows an example of the detection range of the infrastructure sensor when the arm has rotated relative to the pole.
Figure 8C:
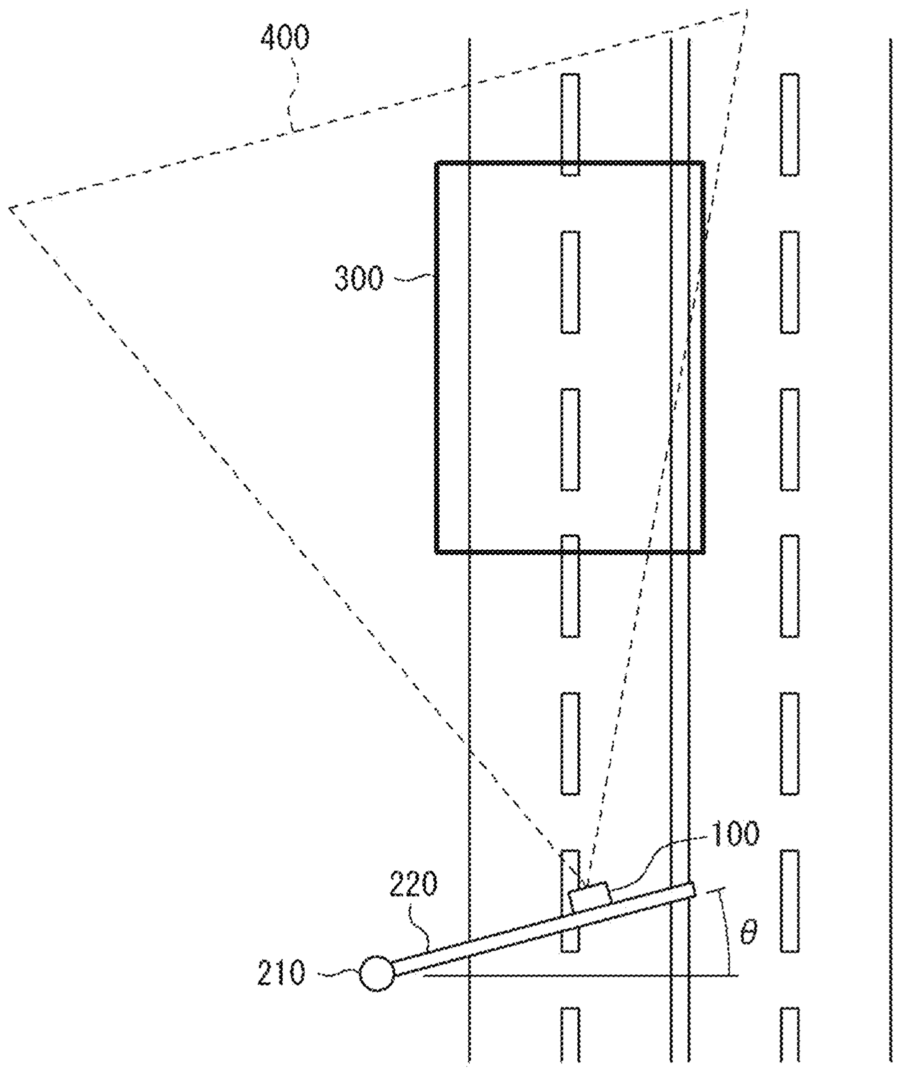
FIG. 8C shows another example of the detection range of the infrastructure sensor when the arm has rotated relative to the pole.

FIG. 8A is a diagram for describing a detection range of the infrastructure sensor 100 when the arm 220 has not rotated relative to the pole 210. FIG. 8B and FIG. 8C are each a diagram for describing a detection range of the infrastructure sensor 100 when the arm 220 has rotated relative to the pole 210. The infrastructure sensor 100 can apply a radio wave to a certain detection range 400, and can detect the position of an object in the detection range 400 by receiving a reflected wave from the object. In the example shown in FIG. 8A, the target area 300, which is a detection guarantee range of the infrastructure sensor 100, is set on the road. In FIG. 8A, the target area 300 is included in the detection range 400. Therefore, the infrastructure sensor 100 can detect the position of the vehicle V in the target area 300.

When the arm 220 rotates relative to the pole 210, the detection range 400 moves. In the example shown in FIG. 8B, the target area 300 is included in the detection range 400 having moved. Therefore, in this case as well, the infrastructure sensor 100 can detect the position of the vehicle V in the target area 300. In this case, the correction unit 123 corrects the detection position of the vehicle V detected by the detection unit 122, in accordance with the rotation angle θ.

When the shift of the position of the infrastructure sensor 100 is too large, the vehicle V traveling on the road cannot be detected anymore. In the example shown in FIG. 8C, movement of the detection range 400 is too large, and a part of the target area 300 is outside the detection range 400. In this case, the infrastructure sensor 100 cannot detect the position of the vehicle V in the target area 300. Therefore, the correction unit 123 outputs abnormality information without correcting the detection position of the vehicle V detected by the detection unit 122.

For example, the first range for determining whether or not to allow execution of correction by the correction unit 123 can be set in advance in the infrastructure sensor 100. For example, the first range can be set as a range where the target area 300 can be included in the detection range 400. That is, in the example shown in FIG. 8B, the rotation angle θ is included in the first range, and in the example shown in FIG. 8C, the rotation angle θ is outside the first range.

FIG. 6 is referred to again. When an inclination angle ϕ detected by the inclination sensor 160 is outside a second range, the correction unit 123 outputs abnormality information without correcting the position of the vehicle V. When the pole 210 is inclined, the angle of the infrastructure sensor 100 relative to the horizontal plane changes, and the height of the infrastructure sensor 100 from the ground also changes. Therefore, the infrastructure sensor 100 cannot accurately detect the position of the vehicle V. Therefore, the second range can be set to be a small range. For example, the second range can be set based on the elastic limit of the pole 210. That is, when the inclination angle ϕ of the pole 210 becomes outside the second range, deformation of the pole 210 exceeds the elastic limit and undergoes plastic deformation. When the pole 210 has undergone plastic deformation, even if the correction unit 123 corrects the detection result obtained by the infrastructure sensor 100, an accurate position of the vehicle V cannot be identified. The second range is defined by a first limit value (e.g., upper limit value) and a second limit value (e.g., lower limit value). The inclination angle detected by the inclination sensor 160 being outside the second range is synonymous with the inclination angle exceeding either one of the first limit value and the second limit value. That is, in other words, when the inclination angle exceeds a threshold (the first limit value or the second limit value), the correction unit 123 outputs abnormality information without correcting the position of the vehicle V. The first limit value and the second limit value of the second range is an example of a "second threshold".

The abnormality information is outputted to an external terminal connected to the infrastructure sensor 10, for example. When the external terminal is not connected to the infrastructure sensor 100, the abnormality information outputted from the correction unit 123 is stored into the nonvolatile memory 112, for example. Upon connection of the external terminal to the infrastructure sensor 100, the abnormality information stored in the nonvolatile memory 112 is transmitted to the external terminal.

[5. Operation of Infrastructure Sensor]

Figure 9:
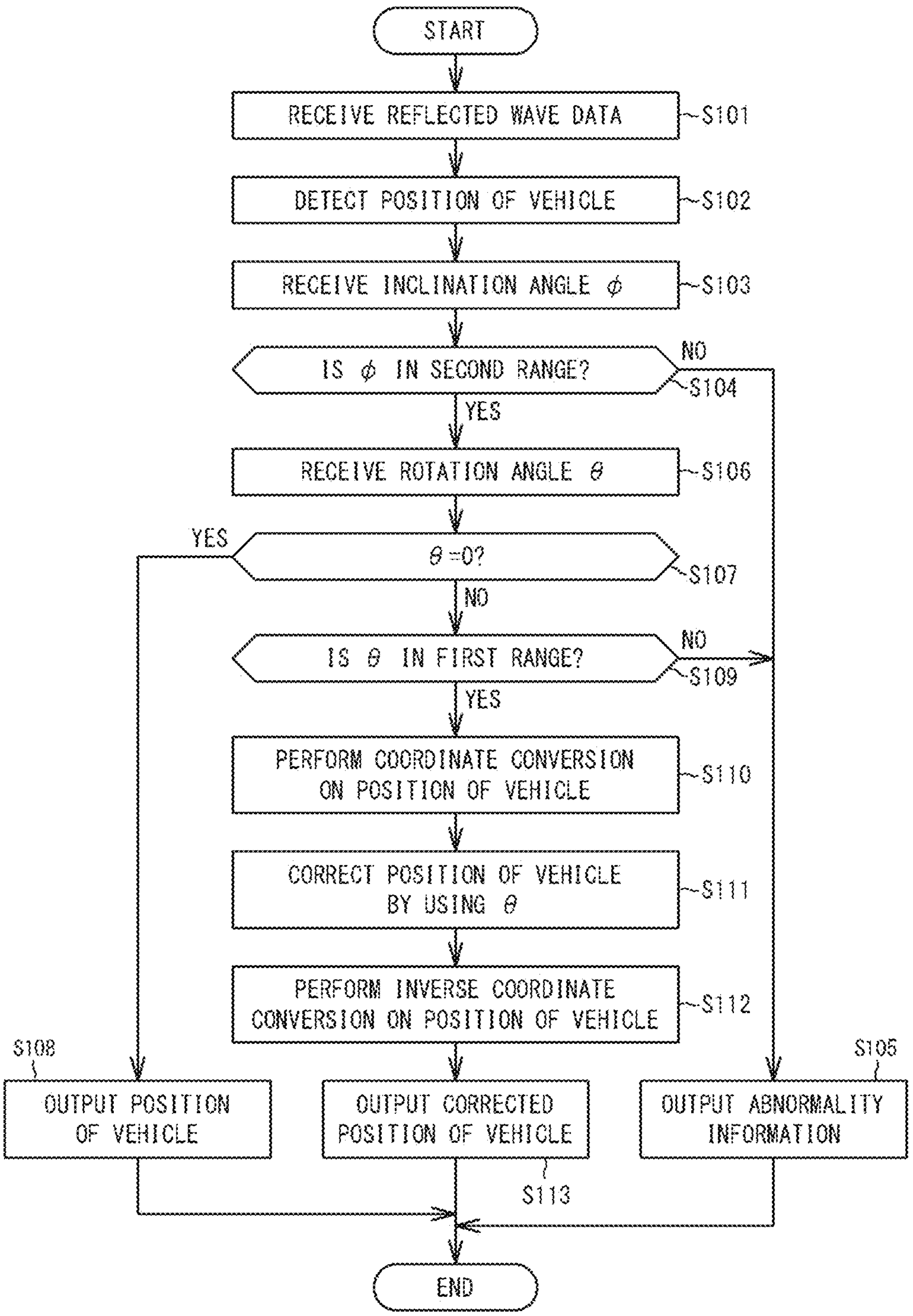
FIG. 9 is a flowchart showing an example of an operation procedure of the infrastructure sensor according to the embodiment.

FIG. 9 is a flowchart showing an example of an operation procedure of the infrastructure sensor 100 according to the embodiment. Upon activation of the correction program 117 by the processor 111, the infrastructure sensor 100 executes the process as described below.

The transmission circuit 114 generates a modulated wave and transmits the generated modulated wave from the transmission antenna 114*a*. The transmitted modulated wave hits the vehicle V, and a reflected wave from the vehicle V is received by the reception antennas 115*a*, 115*b*. The reception circuit 115 processes a reflected wave signal to generate reflected wave data. The processor 111 receives the reflected wave data (step S101).

The processor 111 analyzes the reflected wave data to detect reflection points. The processor 111 groups reflection points regarding the same vehicle V to detect the position of the vehicle V (step S102).

The inclination sensor 160 outputs inclination data indicating the inclination angle ϕ of the pole 210. The processor 111 receives the inclination data (step S103).

The processor 111 compares the inclination angle ϕ with the second range and determines whether or not ϕ is in the second range (step S104). When ϕ is in the second range (YES in step S104), the processor 111 proceeds to step S106. When ϕ is outside the second range (NO in step S104), the processor 111 outputs abnormality information (step S105).

The angle sensor 150 outputs angle data indicating the rotation angle θ of the arm 220 relative to the pole 210. The processor 111 receives the angle data (step S106).

The processor 111 determines whether or not the rotation angle θ is 0 (step S107). Here, it is sufficient to identify that the arm 220 has not rotated relative to the pole 210, and thus, it is sufficient to be able to determine that the rotation angle θ is substantially 0. For example, a range including a detection error of the angle sensor 150 can be used as the range corresponding to 0.

When θ is 0 (YES in step S107), the processor 11 outputs the position of the vehicle V detected in step S102 (step S108). That is, in this case, the processor 111 does not correct the detected position of the vehicle V.

When θ is not 0 (NO in step S107), the processor 111 determines whether or not θ is in the first range (step S109). When θ is in the first range (YES in step S109), the processor 111 proceeds to step S110. When θ is outside the first range (NO in step S109), the processor 111 outputs abnormality information (step S105).

In step S110, the processor 111 performs coordinate conversion on the detected position of the vehicle V from that in the XYZ coordinate system to that in the xyz coordinate system. The processor 111 applies formula (1) to the position of the vehicle V after the coordinate conversion, and corrects the position of the vehicle V by using θ (step S1). Further, the processor 111 performs inverse coordinate conversion on the corrected position of the vehicle V from that in the xyz coordinate system to that in the XYZ coordinate system (step S112).

The processor 111 outputs the corrected position of the vehicle V in the XYZ coordinate system (step S113). The infrastructure sensor 100 repeats the above operations. The order of the steps need not be the above-described order. For example, the order of step S101 and S102 may be between step S109 and S110. Then, when abnormality information is to be outputted, it is not necessary to execute the process of receiving reflected wave data, analyzing the reflected wave data, and detecting the position of the vehicle V.

[6. Modification]

Figure 10:
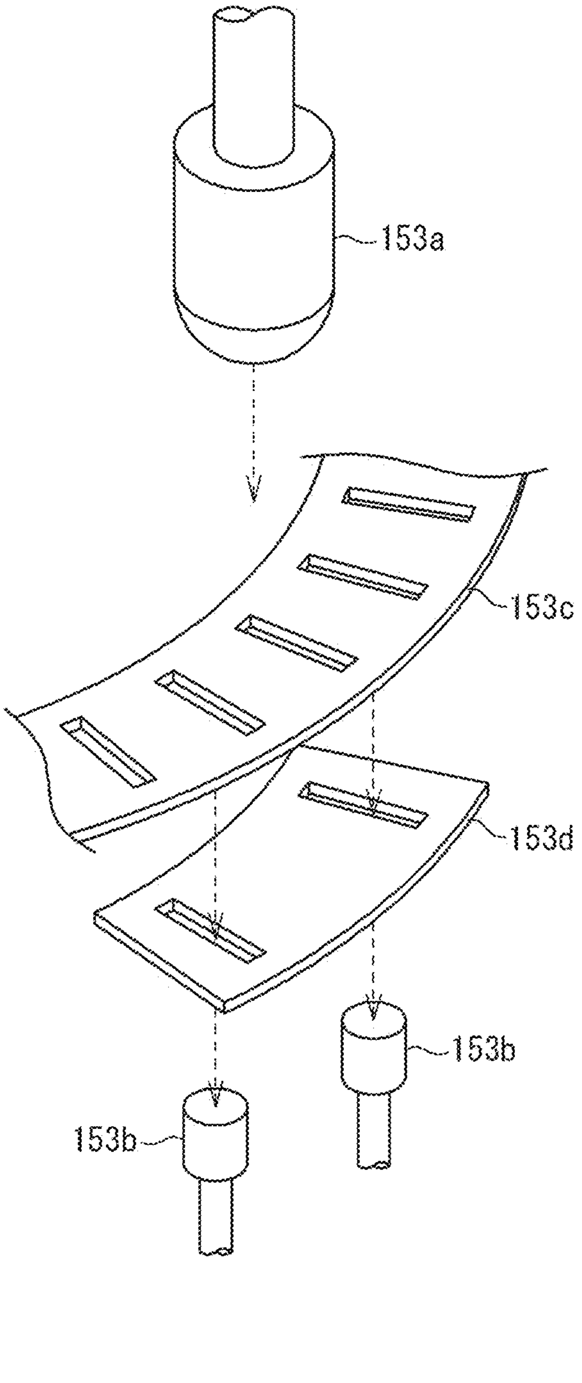
FIG. 10 shows a modification using a rotary encoder as the angle sensor according to the embodiment.

The angle sensor 150 need not necessarily be a potentiometer, and may be a non-contact type sensor such as a rotary encoder. FIG. 10 shows a modification using a rotary encoder as the angle sensor according to the embodiment. For example, the angle sensor 150 may include a light-emitting element 153*a* such as an LED, a light-receiving element 153*b*, and slit plates 153*c*, 153*d* each having a plurality of slits. The slit plates 153*c*, 153*d* are disposed between the light-emitting element 153*a* and the light-receiving element 153*b*. The first member 151 may include the light-emitting element 153*a*, the light-receiving element 153*b*, and the slit plate 153*d*, and the second member 152 may include the slit plate 153*c*. Accordingly, when the second member 152 has rotated relative to the first member 151, the positional relationship between the light-emitting element 153*a* and the light-receiving element 153*b*, and the slit plate 153*c* changes. The slit plate 153*d* is fixedly disposed relative to the light-emitting element 153*a* and the light-receiving element 153*b*. Accordingly, in accordance with the position of the slit plate 153*c*, light applied from the light-emitting element 153*a* is received or is not received by the light-receiving element 153*b*. The rotation angle θ is detected by counting pulses outputted from the light-receiving element 153*b*.

The light-emitting element 153*a*, the light-receiving element 153*b*, and the slit plate 153*d* may be disposed at the second member 152, and the slit plate 153*c* may be disposed at the first member 151. With the angle sensor 150 having such a configuration as well, the rotation angle θ of the arm 220 relative to the pole 210 can be detected.

Figure 11A:
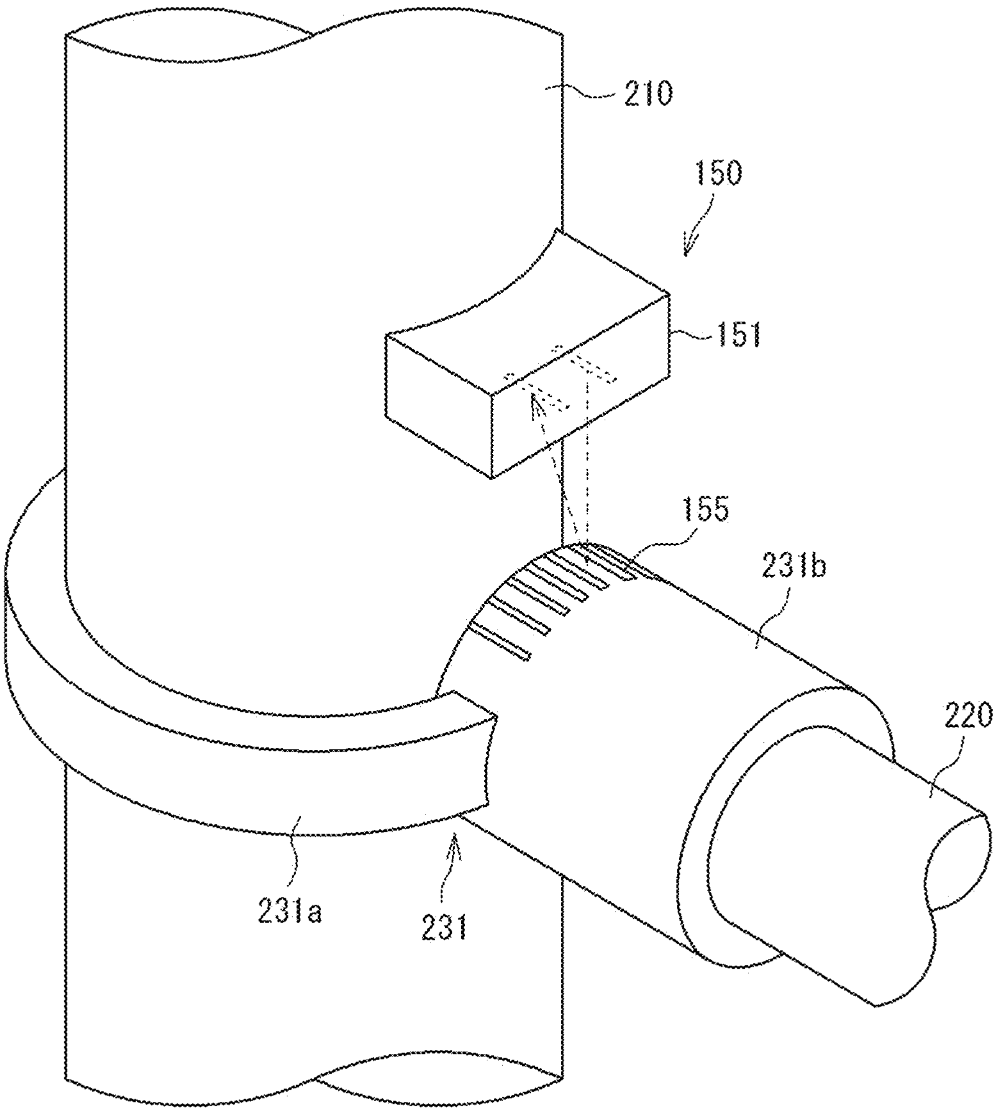
FIG. 11A shows a modification using a reflection-type optical sensor as the angle sensor according to the embodiment.
Figure 11B:
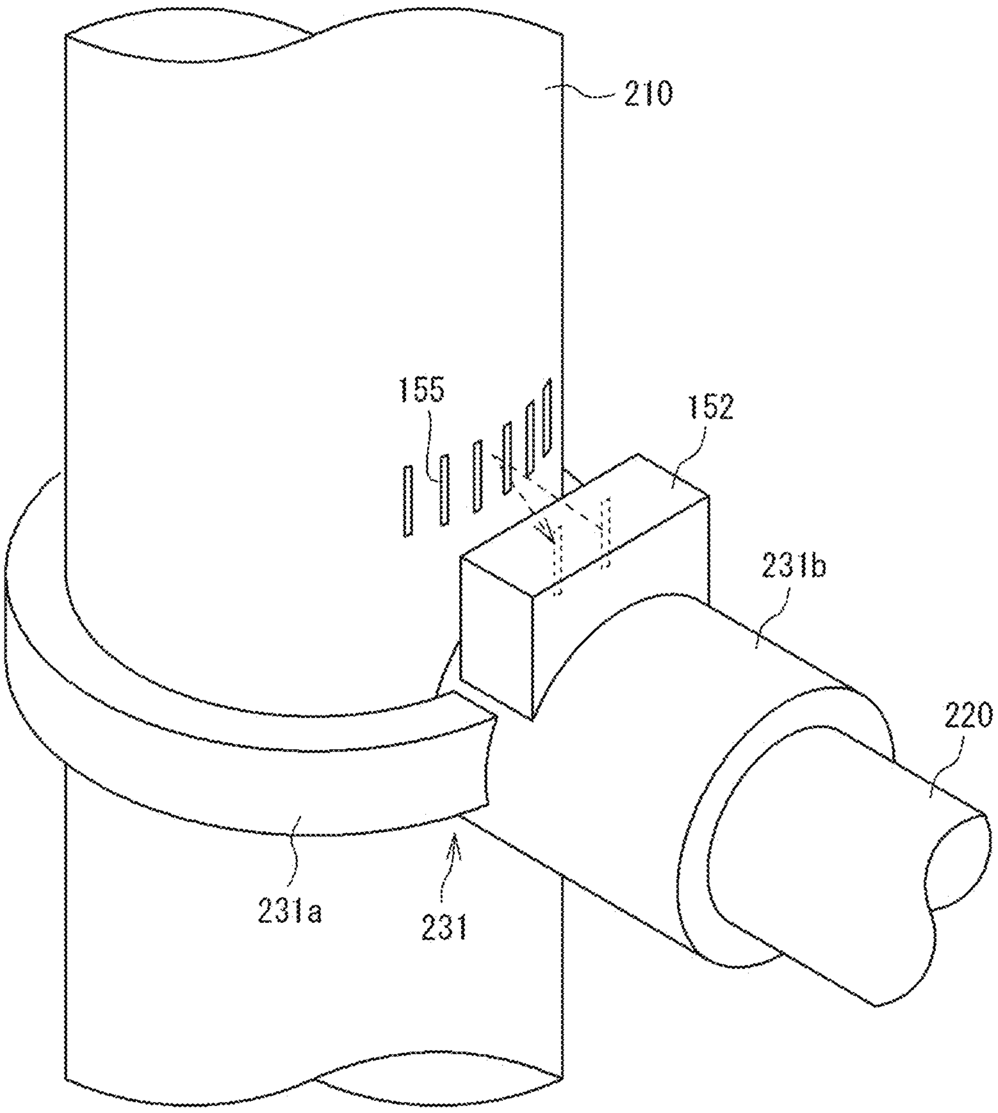
FIG. 11B shows another modification using a reflection-type optical sensor as the angle sensor according to the embodiment.

As another modification, the angle sensor 150 can be configured by using a reflection-type optical sensor. FIG. 11A and FIG. 11B each show a modification using a reflection-type optical sensor as the angle sensor according to the embodiment. In the example shown in FIG. 11A, a reflection-type optical sensor is disposed at the first member 151. In the present modification, the second member 152 is omitted, and a plurality of slits 155 are provided in the arm fixation part 231*b*. In the example shown in FIG. 11B, a reflection-type optical sensor is disposed at the second member 152. In the present modification, the first member 151 is omitted and the plurality of slits 155 are provided in the pole 210.

When the arm 220 rotates relative to the pole 210, the positional relationship between the slits 155 and the reflection-type optical sensor changes. When the reflection point of light applied from the reflection-type optical sensor is between two adjacent slits 155, light reflected at the surface of the arm fixation part 231*b* or the pole 210 is received by the reflection-type optical sensor, and the light reception level of the reflection-type optical sensor increases. When the reflection point of light applied from the reflection-type optical sensor is a slit 155, the light applied from the reflection-type optical sensor is not reflected, and the light reception level of the reflection-type optical sensor decreases. The rotation angle θ is detected by counting pulses outputted from the reflection-type optical sensor.

Further, as another modification, the angle sensor 150 may be a gyro sensor. That is, in the present modification, the angle sensor 150 detects the angular velocity of the arm 220. Based on the angular velocity detected by the angle sensor 150, the rotation angle θ of the arm 220 relative to the pole 210 is calculated. That is, the rotation angle θ of the arm 220 relative to the pole 210 can be calculated by integrating the detected angular velocity. The calculation of the rotation angle θ may be executed by the angle sensor 150, or may be executed by the processor 111. Based on the calculated rotation angle, the correction unit 123 corrects the position of the vehicle V detected by the detection unit 122.

When the angle sensor 150 is a gyro sensor, there is no need to dispose the angle sensor 150 at the connection place between the pole 210 and the arm 220. The angle sensor 150 can be disposed at a desired position of the arm 220. For example, the angle sensor 150 may be disposed in a housing of the infrastructure sensor 100.

In the embodiment described above, the infrastructure sensor 100 is a radio wave radar. However, the present disclosure is not limited thereto. A camera or a LiDAR (Light Detection and Ranging) which detects the position of an object by using a laser may be used as the infrastructure sensor 100.

[7. Effects]

The traffic monitoring system 10 according to the embodiment includes the infrastructure sensor 100 and the angle sensor 150. The infrastructure sensor 100 is mounted to the arm 220. The arm 220 extends from the pole 210 being a stationary object fixed to a road surface or equipment, and is rotatable in the circumferential direction of the pole 210. The angle sensor 150 is disposed at a place where the arm 220 is connected to the pole 210. The angle sensor 150 detects the rotation angle of the arm 220 relative to the pole 210. The infrastructure sensor 100 includes the detection unit 122 and the correction unit 123. The detection unit 122 detects the position of the vehicle V (object) present in the target area 300 being the detection target area of the infrastructure sensor 100. Based on the rotation angle detected by the angle sensor 150, the correction unit 123 corrects the position of the vehicle V detected by the detection unit 122. Accordingly, when the installation position of the infrastructure sensor 100 has been shifted, the detection result obtained by the infrastructure sensor 100 can be corrected. Therefore, the vehicle V can be accurately detected by the infrastructure sensor 100.

The angle sensor 150 may include the first member 151 and the second member 152. The first member 151 is fixed to the pole 210. The second member 152 is fixed to the arm 220. The second member 152 rotates in the circumferential direction of the first member 151 in accordance with rotation of the arm 220. The angle sensor 150 detects the rotation angle of the second member 152 relative to the first member 151, thereby detecting the rotation angle of the arm 220 relative to the pole 210. Accordingly, the angle sensor 150 that detects the rotation angle of the arm 220 relative to the pole 210 can be realized.

The arm 220 may be supported by the support member 231 so as to be rotatable relative to the pole 210. The support member 231 rotates in the circumferential direction of the pole 210 in accordance with rotation of the arm 220. The angle sensor 150 may include the first member 151 and the second member 152. The first member 151 is fixed to the pole 210. The second member 152 is fixed to the support member 231, and rotates in the circumferential direction of the first member 151 in accordance with rotation of the support member 231. The angle sensor 150 detects the rotation angle of the second member 152 relative to the first member 151, thereby detecting the rotation angle of the arm 220 relative to the pole 210. Accordingly, the angle sensor 150 can be mounted to the connection place between the pole 210 and the arm 220 so as to be able to detect the rotation angle of the arm 220 relative to the pole 210.

When the rotation angle detected by the angle sensor 150 exceeds (the rotation angle is outside the first range) the first threshold, the correction unit 123 may output abnormality information without correcting the position of the vehicle V. Accordingly, when the shift amount of the position of the infrastructure sensor 100 is too large to be allowed, abnormality information can be outputted without correcting the detection result obtained by the infrastructure sensor 100.

The traffic monitoring system 10 may further include the inclination sensor 160. The inclination sensor 160 detects the inclination angle of the pole 210 relative to the vertical axis (reference direction). When the inclination angle detected by the inclination sensor 160 exceeds (the inclination angle is outside the second range) the second threshold, the correction unit 123 may output abnormality information without correcting the position of the vehicle V. Accordingly, when the inclination of the pole 210 is too large to be allowed, abnormality information can be outputted without correcting the detection result obtained by the infrastructure sensor 100.

The traffic monitoring system 10 according to the embodiment includes the infrastructure sensor 100 and the angle sensor 150 being a gyro sensor. The infrastructure sensor 100 is mounted to the arm 220. The arm 220 extends from the pole 210 being a stationary object fixed to a road surface or equipment, and is rotatable in the circumferential direction of the pole 210. The angle sensor 150 detects the angular velocity of the arm 220. The infrastructure sensor 100 includes the detection unit 122 and the correction unit 123. The detection unit 122 detects the position of the vehicle V present in the target area 300 being the detection target area of the infrastructure sensor 100. Based on the rotation angle of the arm 220 relative to the pole 210, the rotation angle being obtained based on the angular velocity detected by the angle sensor 150, the correction unit 123 corrects the position of the vehicle V detected by the detection unit 122. Accordingly, when the installation position of the infrastructure sensor 100 has been shifted, the detection result obtained by the infrastructure sensor 100 can be corrected. Therefore, the vehicle V can be accurately detected by the infrastructure sensor 100.

[8. Supplementary Note]

The embodiment disclosed herein is merely illustrative in all aspects and should not be recognized as being restrictive. The scope of the present disclosure is defined not by the above embodiment but by the scope of the claims, and is intended to include meaning equivalent to the scope of the claims and all modifications within the scope.

REFERENCE SIGNS LIST

10 traffic monitoring system (object detection system)
100 infrastructure sensor
111 processor
112 nonvolatile memory
113 volatile memory
114 transmission circuit
114*a* transmission antenna
115 reception circuit
115*a*, 115*b* reception antenna
116 input/output interface (I/O)
117 correction program
121 input unit
122 detection unit
123 correction unit
150 angle sensor
151 first member
151*a* brush
151C first circuit
152 second member
152C second circuit
152R resistor
153*a* light-emitting element
153*b* light-receiving element
153*c*, 153*d* slit plate
155 slit
160 inclination sensor
210 pole
220 arm
221 arm body
222 lower support arm
223 upper support arm
231, 232, 233 support member
231*a* annular part
231*b* arm fixation part
300 target area
400 detection range
400A detection range
V vehicle

The invention claimed is:

1. An object detection system comprising:
an infrastructure sensor mounted to an arm extending from a stationary object fixed to a road surface or equipment, the arm being rotatable in a circumferential direction of the stationary object; and
an angle sensor disposed at a place where the arm is connected to the stationary object, the angle sensor being configured to detect a rotation angle of the arm, wherein
the infrastructure sensor includes circuitry configured to:
detect a position of an object present in a detection target area of the infrastructure sensor, and
correct the position of the object detected by the detection unit, based on the rotation angle detected by the angle sensor, and
the angle sensor includes:
a first member fixed to the stationary object, and
a second member fixed to the arm and configured to rotate in a circumferential direction of the first member in accordance with rotation of the arm, and
detects a rotation angle of the second member relative to the first member, thereby detecting the rotation angle of the arm relative to the stationary object.

2. The object detection system according to claim 1, wherein when the rotation angle detected by the angle sensor exceeds a first threshold, the circuitry outputs abnormality information without correcting the position of the object.

3. The object detection system according to claim 1, further comprising an inclination sensor configured to detect an inclination angle of the stationary object relative to a reference direction, wherein when the inclination angle detected by the inclination sensor exceeds a second threshold, the circuitry outputs abnormality information without correcting the position of the object.

4. An object detection system comprising:

an infrastructure sensor mounted to an arm extending from a stationary object fixed to a road surface or equipment, the arm being rotatable in a circumferential direction of the stationary object; and an angle sensor disposed at a place where the arm is connected to the stationary object, the angle sensor being configured to detect a rotation angle of the arm, wherein the infrastructure sensor includes circuitry configured to:

detect a position of an object present in a detection target area of the infrastructure sensor, and correct the position of the object detected by the detection unit, based on the rotation angle detected by the angle sensor, wherein the arm is supported by a support member so as to be rotatable relative to the stationary object, the support member rotates in the circumferential direction of the stationary object in accordance with rotation of the arm, and the angle sensor includes:

a first member fixed to the stationary object; and a second member fixed to the support member and configured to rotate in a circumferential direction of the first member in accordance with rotation of the support member, and detects a rotation angle of the second member relative to the first member, thereby detecting the rotation angle of the arm relative to the stationary object.

5. The object detection system according to claim 4, wherein when the rotation angle detected by the angle sensor exceeds a first threshold, the circuitry outputs abnormality information without correcting the position of the object.

6. The object detection system according to claim 4, further comprising an inclination sensor configured to detect an inclination angle of the stationary object relative to a reference direction, wherein when the inclination angle detected by the inclination sensor exceeds a second threshold, the circuitry outputs abnormality information without correcting the position of the object.

7. An infrastructure sensor mounted to an arm extending from a stationary object fixed to a road surface or equipment, the arm being rotatable in a circumferential direction of the stationary object, the infrastructure sensor comprising circuitry configured to:

detect a position of an object present in a detection target area of the infrastructure sensor; and correct the position of the object detected by the detection unit, based on a rotation angle of the arm relative to the stationary object, the rotation angle having been detected by an angle sensor disposed at a place where the arm is connected to the stationary object, wherein the angle sensor includes:

a first member fixed to the stationary object, and a second member fixed to the arm and configured to rotate in a circumferential direction of the first member in accordance with rotation of the arm, and detects a rotation angle of the second member relative to the first member, thereby detecting the rotation angle of the arm relative to the stationary object.

8. The infrastructure sensor according to claim 7, wherein when the rotation angle detected by the angle sensor exceeds a first threshold, the circuitry outputs abnormality information without correcting the position of the object.

9. The infrastructure sensor according to claim 7, further comprising an inclination sensor configured to detect an inclination angle of the stationary object relative to a reference direction, wherein when the inclination angle detected by the inclination sensor exceeds a second threshold, the circuitry outputs abnormality information without correcting the position of the object.

10. An infrastructure sensor mounted to an arm extending from a stationary object fixed to a road surface or equipment, the arm being rotatable in a circumferential direction of the stationary object, the infrastructure sensor comprising circuitry configured to:

detect a position of an object present in a detection target area of the infrastructure sensor; and correct the position of the object detected, based on a rotation angle of the arm relative to the stationary object, the rotation angle having been detected by an angle sensor disposed at a place where the arm is connected to the stationary object, wherein the arm is supported by a support member so as to be rotatable relative to the stationary object, the support member rotates in the circumferential direction of the stationary object in accordance with rotation of the arm, and the angle sensor includes:

a first member fixed to the stationary object; and a second member fixed to the support member and configured to rotate in a circumferential direction of the first member in accordance with rotation of the support member, and detects a rotation angle of the second member relative to the first member, thereby detecting the rotation angle of the arm relative to the stationary object.

11. The infrastructure sensor according to claim 10, wherein when the rotation angle detected by the angle sensor exceeds a first threshold, the circuitry outputs abnormality information without correcting the position of the object.

12. The infrastructure sensor according to claim 10, further comprising an inclination sensor configured to detect an inclination angle of the stationary object relative to a reference direction, wherein when the inclination angle detected by the inclination sensor exceeds a second threshold, the circuitry outputs abnormality information without correcting the position of the object.

* * * * *